March 7, 1961   D. S. RIDLER   2,974,312
METHODS OF SYNCHRONISING RECORDED INTELLIGENCE
Filed Feb. 10, 1955   2 Sheets-Sheet 1

Inventor
D. S. RIDLER
Attorney

Inventor
D. S. RIDLER

United States Patent Office 2,974,312
Patented Mar. 7, 1961

2,974,312

METHODS OF SYNCHRONISING RECORDED INTELLIGENCE

Desmond Sydney Ridler, London, England, assignor to International Standard Electric Corporation, New York, N.Y., a corporation of Delaware Filed Feb. 10, 1955, Ser. No. 487,419

Claims priority, application Great Britain Feb. 25, 1954

7 Claims. (Cl. 340—174.1)

This invention relates to an equipment for storing intelligence signals and more particularly, but not exclusively, to an equipment in which the signals are in the form of electrical pulses and are stored upon a magnetic medium.

According to the present invention we provide a storage equipment comprising a storing device including a storage medium, means for storing signals on or in said medium and further means for reading said stored signals, adjustable means external to said storing device for selecting a portion of a read signal.

According to the present invention there is further provided a storage equipment comprising a storage device including a magnetic storage medium, a recording head for storing signals on said medium and a reading head for reading said stored signals, a source of clock pulses, means under control of said clock pulses for determining the instant at which said signals are to be recorded on said magnetic medium, and means operated by said clock pulses for generating a number of control pulses within the width of a single element, and means for selectively applying one of said control pulses to gating means connected to said reading head whereby a selected portion only of a signal element read by said reading head passes through said gating means.

According to the present invention there is further provided a storage equipment comprising a storage device including a sonic delay line storage medium, means for storing signals in said medium and means for reading said stored signals, a source of clock pulses and means under the control of said clock pulses for determining the instant at which said signals are to be stored in said medium, and means operated by said clock pulses for generating a number of control pulses within the width of a single signal element, and means for selectively applying one of said control pulses to a gating means connected to said reading means whereby a selected portion only of a signal element read by said reading means passes through said gating means.

According to the present invention there is further provided a storage equipment comprising a photographic film storage medium, photoelectric means for storing signals in said medium and photoelectric means for reading said stored signals, a source of clock pulses and means under the control of said clock pulses for determining the instant at which said signals are to be stored on said medium, means operated by said clock pulses for generating a number of control pulses within the width of a single signal element, and means for selectively applying one of said control pulses to a gating means connected to said photoelectric reading means whereby a selected portion only of a signal element read by said reading means passes through said gating means.

The invention will now be described with reference to an embodiment shown in the accompanying drawing in which.

In magnetic drum storage equipments, such as that described in the copending application of Wright and Rice, Serial No. 289,383, filed May 22, 1952, now issued into Patent No. 2,838,745, on June 10, 1958, either the reading or recording head has to be made adjustable with reference to the head reading the "clock" pulses in order that a control signal derived from each "clock" pulse shall coincide with part of the read signal element where there is minimum distortion. Owing to the very short duration of the read signal element (about 5 $\mu$sec.) this mechanical adjustment is difficult to perform accurately and has necessitated the incorporation of expensive and delicate mounting and adjusting apparatus.

Figure 1:
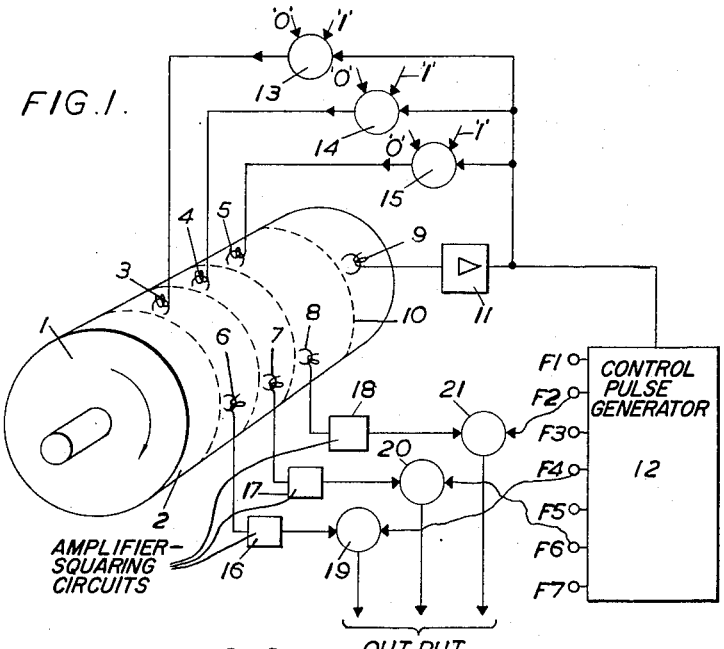
Fig. 1 is a schematic representation of a storage equipment.

In Fig. 1 of the accompanying drawing there is illustrated a schematic representation of a storage equipment in which the storage medium is a brass drum 1 having a skin of magnetic material, such as nickel, on its cylindrical surface 2. The drum is rotated at a constant speed in a clockwise direction by a driving device (not shown). The recording device comprises three recording heads 3, 4 and 5 which are placed side-by-side close to the surface of the drum. The reading device comprises three reading heads 6, 7 and 8 which are similarly mounted close to a further portion of the drum's surface but in alignment with the endless tracks traced by recording heads 3, 4 and 5 respectively. A further head 9 reads signals stored on a "clock" track 10. These signals, hereinafter referred to as "clock pulses" form an unbroken series of accurately spaced pulses each of the same polarity and the same width. They appear in the head 9 as a series of negative pulses and are passed via the pulse amplifier 11 into the device 12 which derives from each clock pulse a series of short control pulses within the width of a single clock pulse. Seven control pulses are produced in the embodiment illustrated in Fig. 1 but fewer or more may be derived as required. The amplified clock pulses are also used to control gate circuits 13, 14 and 15 the outputs of which are connected to the recording heads 3, 4 and 5 respectively. Each of these gates has three inputs: to the first are applied the "0" signals to be recorded and to the second are applied the "1" signals to be recorded and to the third are applied the amplified clock pulses. Coincidence between either a "0" or "1" signal and a clock pulse will open the gate and allow the corresponding "0" or "1" to be recorded on the drum. This gating circuit is described in more detail with reference to Fig. 6.

The reading heads 6, 7 and 8 are connected via amplifier-squaring circuits 16, 17 and 18 respectively to one input of the double-control coincidence gate elements 19, 20 and 21. The outputs of each gate are passed to other electrical circuitry. The other input of each gate element is connected to a selected output of the device 12.

The amplifier-squaring circuits 16, 17 and 18 are high gain amplifiers which are overloaded by the read signals. This results in the peak of the read signals being chopped off so that the output has an approximately square waveform.

Figure 2:
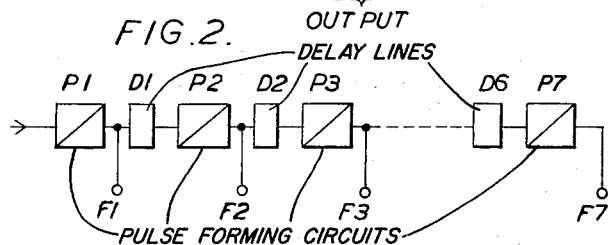
Fig. 2 shows a block schematic diagram of the device 12 illustrated in Fig. 1.

Fig. 2 is a block schematic diagram of the device 12. Each negative clock pulse read by the head 9 from the track 10 and amplified by the pulse amplifier 11 (Fig. 1), is passed into a pulse forming circuit P1 (to be described in more detail with reference to Fig. 3). In response to the leading edge of each amplified clock pulse the pulse forming circuit P1 produces a control pulse having a width approximately 1/7 the width of the clock pulse. This control pulse appears at the output F1 and is also passed to the delay network D1. The delay network is so arranged in conjunction with the pulse forming circuit P2 that the second control pulse appearing at the output F2 lags behind the first-control pulse F1 by 1/7 the width of the clock pulse. Similarly pulses having the same width are produced at the outputs F3 to F7, each lagging behind the previous pulse by 1/7 of the width of the clock pulse. It will be seen therefore that in response to the application of each clock pulse the device 12 produces 7 control pulses (each having a width equal to 1/7 of a clock pulse) within the width of each clock pulse.

Figure 3:
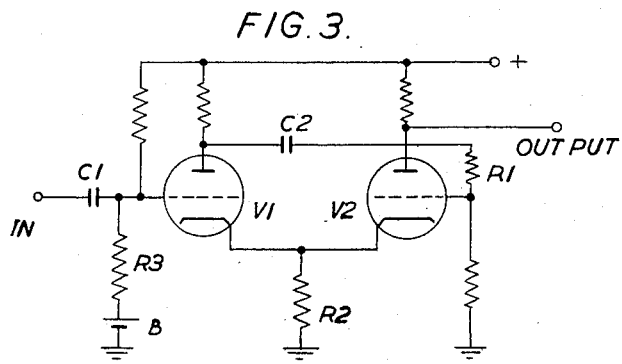
Fig. 3 shows a typical pulse forming circuit for P1, P2 etc. illustrated in Fig. 2.

Fig. 3 illustrates a pulse forming circuit in which in the quiescent condition the valve V1 is conducting and V2 is non-conducting. The grid of V1 is driven negative by the leading edge of an amplified clock pulse (or a negative pulse from one of the delay networks D1 to D6) and the capacitor C1 is charged. This causes the anode current of V1 to decrease which results in an increase in the anode potential of V1, which increase is passed to the grid of V2 via the capacitor C2 and the resistor R1. V2 starts to conduct and the increase in its anode current increases the potential drop across the common cathode resistor R2, thus driving the grid of V1 more negative. It will be seen that a cumulative effect takes place and the circuit switches over so that V1 becomes non-conducting and V2 conducting. After a predetermined time depending upon the time constant C1—R3, the grid of V1 becomes less negative and the anode current of V1 increases. The resulting decrease in anode potential of V1 is passed to the grid of V2 via C2 and R1 and reduces the anode current of V2. The potential across R2 falls, thus making the grid of V1 more positive. Once again a cumulative effect ensues and the valves switch back to their original condition. The output of the circuit is taken from the anode of V2 and comprises negative pulses having a width determined by the values of the capacitor C1 and resistor R3.

Figure 4:
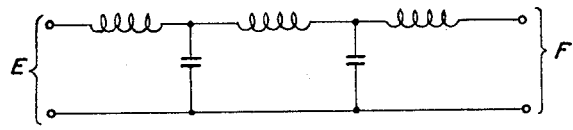
Fig. 4 shows a typical delay network for D1, D2 etc. illustrated in Fig. 2.

Fig. 4 shows an inductor-capacitor network suitable for the delay networks D1, D2 . . . D6. Such a network will delay the transmission of pulses between the input terminals E and output terminals F for a time dependent upon the values of the circuit elements, which time may be determined by conventional filter calculations.

Figure 5:
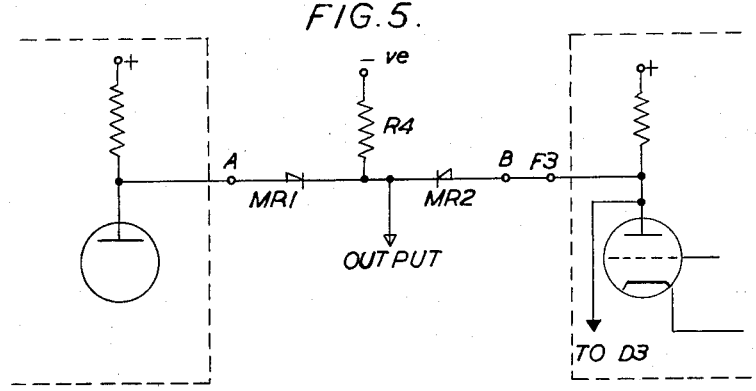
Fig. 5 shows a double control coincident gate which may be used as the gates 19, 20 or 21 in Fig. 1.

Fig. 5 illustrates a double control gating circuit (19, 20 or 21 in Fig. 1) comprising two rectifiers MR1 and MR2 having their negative plates connected together. The output from the gate is taken from the junction of the two rectifiers which is also connected to a source of negative potential via resistor R4.

The control point A is connected to the output of the amplifier-squaring circuit 16, 17 or 18 and the control point B to a selected control pulse appearing at the output F1 to F7 of the device 12. Part of the output stage of both 16 or 17 or 18 and P3 are illustrated (F3 is assumed to be the selected output).

It will be seen that the control points A and B are normally positive with respect to the negative on the resistor R4 so that the rectifiers MR1 and MR2 are biassed to their low impedance condition. When a signal in a form of a negative pulse in the reading head coincides with a negative control pulse at F3 both control points A and B go more negative than the negative on the resistor R4, the rectifiers MR1 and MR2 become non-conductive and the output goes negative for the duration of the control pulse F3. When a positive signal pulse in the reading head coincides with the negative control pulse at F3 then there is no change in the output potential, since only the rectifier MR2 becomes non-conducting.

Figure 6:
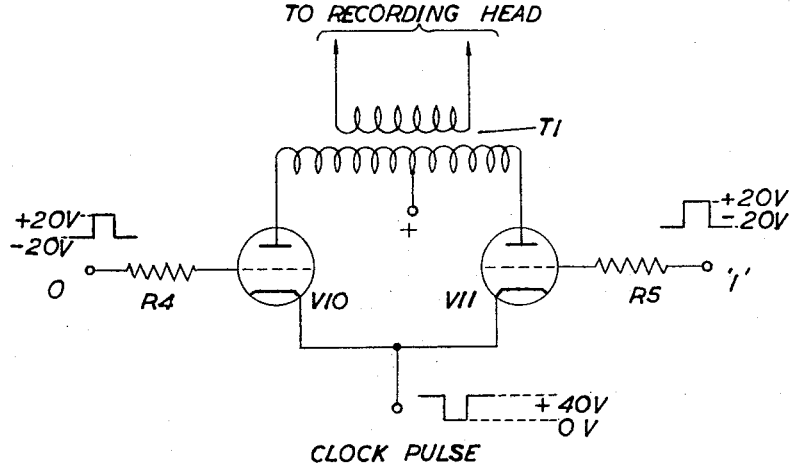
Fig. 6 illustrates a double control coincidence gate circuit suitable for positions 13, 14 and 15 in Fig. 1.

Fig. 6 illustrates a gate circuit for use as 13, 14 or 15 in Fig. 1. It comprises two triode valves V10 and V11 the anodes of which are connected to either side of the primary winding of an output transformer T1. The centre tap of the primary winding is connected to H.T. positive and the secondary winding goes to one of the recording heads 3, 4 or 5. The cathodes of the two valves are commoned and have applied to them the negative clock pulses of —40 v. amplitude. When no clock pulse is present the cathodes are at a potential of +40 v. To the grid of V10 via the resistor R4 is applied the "0" signal. When no "0" signal is present the grid is biassed to —20 v. but when a "0" signal is present this is raised to +20 v. for the duration of the signal. Similarly "1" signals having the same amplitude and polarity are applied to the grid of V11 via the resistor R5.

When there is neither a clock pulse nor a "0" or "1" pulse present then the grids of both V10 and V11 will be at —60 v. with respect to the cathodes and the valves will be non-conducting. If a clock pulse only is received, then the grids of both valves will rise to —20 v. negative but both valves will remain non-conducting and there will be no output. When a clock pulse coincides with a "0" pulse, then the grid of V10 rises to +20 volts and the valve becomes conductive. Current will flow in the left hand half of the primary winding of T1 and will induce a pulse into the secondary of T1 which is then passed to the recording head and recorded. Should however a "1" pulse be received at the grid of V11 at the same time as a negative clock pulse, then the valve V11 becomes conductive and a current will flow in the right hand half of the primary of T1. A pulse of the reverse polarity, a "0" pulse will be induced into the secondary of T1 and passed to the recording head.

When setting up the equipment the heads are so arranged that a control pulse at F4 of the device 12 occurs at approximately the correct working point of a read signal pulse as it appears at the input A to the gates 19, 20 and 21; the final adjustment is carried out by selecting the output of the device 12 that coincides with the correct working point of the read signal pulse.

It will be understood that the circuits shown in Figs. 3, 4, 5 and 6 are given by way of example only and that other circuits performing these general functions could be used. In particular a gate circuit could be used in place of that illustrated in Fig. 5 for the positions 19, 20 and 21 (Fig. 1) so that an output is obtained when the read signal is either positive or negative instead of only when it is negative as is the case with the type described.

Although in the equipment described above separately mounted reading and recording heads are used the two heads may be mounted in fixed relation to each other in a common support. Again a single head may perform in known manner the dual function of reading and recording. In the claims accompanying this specification it is to be understood that the words "reading and recording means" include the types of head just referred to i.e. separately mounted heads, a compound head, and a single reading and recording head.

Although in Fig. 1 the clock pulses are obtained from a separate track recorded on the drum they could be derived in other well-known ways, e.g. a toothed wheel rotating in synchronism with the drum. Alternately the clock pulses could be obtained from a master pulse source independent of the drum and from which the signals to be stored are also derived. In the latter case the amplifier 11 would probably be unnecessary.

Instead of the magnetic drum illustrated in Fig. 1 it will be clear to those skilled in the art that a magnetic tape or magnetic disc may also be used for storing the signals.

In the case where an independent pulse source is employed, then a magnetic wire may be used as the storage medium.

Again, where an independent pulse source is used, the storage medium could be a sonic delay line, such as a mercury delay line. In this case the recording and reading means would be the piezo-electric crystals; one at either end of the line. Another type of sonic line that could be used is a magneto-strictive delay line.

While the principles of the invention have been described above in connection with specific embodiments, and particular modifications thereof, it is to be clearly understood that this description is made only by way of example and not as a limitation on the scope of the invention.

What I claim is:

1. Equipment for recording and reading intelligence in the form of signal elements having a certain time duration, comprising means for finely adjusting the time at which reading takes place, so as to compensate for normally occurring variations in adjustment of the equipment, said means comprising means for subdividing the time duration of a signal element, adjustable means for selecting a particular subdivision of said element, means for reading and checking the character of a recorded signal element, and means for utilizing said selected subdivision for selecting a desired portion of said recorded element thus read.

2. Equipment for the storage of intelligence received in the form of electric signals which comprises a storage means providing a number of storage elements each capable of storing an intelligence signal, recording and reading means for recording into and reading from the said storage elements in respective repetitive time cycles, the time relation between said recording and reading cycles being fixed, and means for finely adjusting the time at which reading takes place, so as to compensate for normally occurring variations in adjustment of the equipment, said means comprising means for checking the character of a signal from said reading means, and adjustable means for causing said reading means and said checking means to co-operate in such a manner that a selected portion only of a read signal is checked to determine its character.

3. Equipment for the storage of intelligence received in the form of electrical signals which comprises a storage device providing a number of storage elements each capable of storing an intelligence signal, recording and reading means for recording intelligence signals in said storage elements and for reading said stored signals, and means for finely adjusting the time at which reading takes place, so as to compensate for normally occurring variations in adjustment of the equipment, said means comprising a pulse generator having a plurality of outputs each adapted to provide a pulse having a length less than the width of an intelligence signal, said pulses occurring at said outputs in time sequence, a utilization circuit connected to said reading means and a selected one of said outputs in such a manner that a selected portion only of a recorded signal is passed into said utilization circuit.

4. A storage equipment comprising a storage device including a movable magnetic storage medium, a recording head for storing signals on said medium and a reading head for reading said stored signals, gating means connected to said reading head and adapted to be opened by a control pulse applied thereto, a source of clock pulses, means under control of said clock pulses for determining the instant at which said signals are to be recorded on said magnetic medium, and means for finely adjusting the time at which reading takes place, so as to compensate for normally occurring variations in adjustment of the equipment, said means comprising means operated by said clock pulses for generating a plurality of control pulses within the width of a single signal element, and means for selectively applying one of said control pulses to said gating means connected to said reading head whereby a selected portion only of a signal element read by said reading head passes through said gating means.

5. An equipment, as claimed in claim 4, and wherein said clock pulses are recorded on said magnetic medium and a further head is provided for reading said clock pulses.

6. An equipment, as claimed in claim 5, and wherein said magnetic medium comprises endless tracks and said signals and said clock pulses are stored on said endless tracks on said medium.

7. An equipment, as claimed in claim 4, wherein said magnetic medium is a magnetic drum.

References Cited in the file of this patent
UNITED STATES PATENTS

| | | |
|---|---|---|
| 2,679,638 | Bensky et al. | May 25, 1954 |
| 2,700,155 | Clayden | Jan. 18, 1955 |
| 2,764,463 | Lubkin et al. | Sept. 25, 1956 |
| 2,797,401 | Green et al. | June 25, 1957 |
| 2,845,609 | Newman et al. | July 29, 1958 |